(12) United States Patent
Bostick et al.

(10) Patent No.: US 11,137,262 B2
(45) Date of Patent: Oct. 5, 2021

(54) NAVIGATION ALERTING USING CONVERSATION ANALYSIS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 41 days.

(21) Appl. No.: 16/548,496

(22) Filed: Aug. 22, 2019

(65) Prior Publication Data

US 2019/0383632 A1    Dec. 19, 2019

Related U.S. Application Data

(63) Continuation of application No. 15/220,212, filed on Jul. 26, 2016, now Pat. No. 10,451,430.

(51) Int. Cl.
| | |
|---|---|
| *G01C 21/36* | (2006.01) |
| *G10L 15/18* | (2013.01) |
| *G10L 15/02* | (2006.01) |
| *G08G 1/0968* | (2006.01) |
| *G10L 15/26* | (2006.01) |

(Continued)

(52) U.S. Cl.
CPC ....... *G01C 21/3608* (2013.01); *G06F 40/284* (2020.01); *G06F 40/289* (2020.01); *G06F 40/30* (2020.01); *G08G 1/09626* (2013.01); *G08G 1/096827* (2013.01); *G10L 15/02* (2013.01); *G10L 15/1815* (2013.01); *G10L 15/1822* (2013.01); *G10L 15/26* (2013.01)

(58) Field of Classification Search
CPC . G01C 21/3608; G06F 40/284; G06F 40/289; G06F 40/30; G08G 1/09626; G08G 1/096827; G10L 15/02; G10L 15/22; G10L 15/00; G10L 25/51
See application file for complete search history.

(56) References Cited

U.S. PATENT DOCUMENTS

| | | | |
|---|---|---|---|
| 2012/0101810 A1* | 4/2012 | Kennewick | G01C 21/3608 704/9 |
| 2012/0253788 A1* | 10/2012 | Heck | G06F 40/30 704/9 |
| 2016/0307571 A1* | 10/2016 | Mizumoto | H04L 12/1831 |

OTHER PUBLICATIONS

List of all IBM related dockets. Appendix P. 2019.

\* cited by examiner

*Primary Examiner* — Anne Marie Antonucci
*Assistant Examiner* — Andrew J Cromer
(74) *Attorney, Agent, or Firm* — Garg Law Firm, PLLC; Rakesh Garg; Anthony V England (57) ABSTRACT

At an application executing in a device in a vehicle, a phrase is detected in a conversation occurring between two users. A determination is made that the phrase is usable in providing a navigation directive. Using NLP, a deep parsing the conversation is performed to extract a context applicable to the phrase. the context is evaluated to determine whether the context is related to a navigation of the vehicle. At the device, from the conversation, a future location is computed of the vehicle during the navigation. Using data from a data source, a suboptimal driving condition is identified on a route between a present location of the vehicle and the future location. A user in the vehicle is alerted about the suboptimal driving condition on the route.

20 Claims, 4 Drawing Sheets

(51) Int. Cl.
*G08G 1/0962* (2006.01)
*G06F 40/30* (2020.01)
*G06F 40/284* (2020.01)
*G06F 40/289* (2020.01)

NAVIGATION ALERTING USING CONVERSATION ANALYSIS

TECHNICAL FIELD

The present invention relates generally to a method, system, and computer program product for providing navigation alerts. More particularly, the present invention relates to a method, system, and computer program product for navigation alerting using conversation analysis.

BACKGROUND

Hereinafter, a "conversation" is a verbal communication between two humans, and not a verbal instruction from a human to a machine, application, or system. For example, a conversation is a verbal communication occurring between two human occupants of a vehicle, e.g., between a driver and a passenger in a car, and not a trigger instruction, command, or phrase specifically configured to be spoken by a human, e.g., the driver, to invoke an intelligent assistant application on a device, e.g., on the driver's smartphone.

Passive listening is the process of receiving speech as input into an application executing on a device, and processing the speech to perform some action. The application processes the speech to detect the presence of a trigger word or phrase in the speech, and performs an action that is configured corresponding to the detection of the trigger word or phrase.

Many intelligent assistance applications, such as Siri in devices operating on Apple's software, Cortana in devices operating on Microsoft's software, Google Now in devices operating on Google's software, and Echo or Alexa in devices operating on Amazon's software use passive listening to detect trigger phrases configured to launch their respective applications. (Apple, Siri, iOS or their combinations are trademarks owned by Apple Inc. in the United States and in other countries. Microsoft, Cortana, Windows, or their combinations are trademarks owned by Microsoft Corporation in the United States and in other countries. Google, Google Now, Android, or their combinations are trademarks owned by Google Inc. in the United States and in other countries. Amazon, Echo, Alexa, or their combinations are trademarks owned by Amazon.com Inc. in the United States and in other countries.)

For example, a verbal command, such as "Hey Siri", when detected during passive listening invokes the Siri application on an iOS device. Similarly, trigger phrase "OK Google" invokes Google Now application on an Android device, trigger phrase "Hi Cortana" invokes Cortana application on a Windows device, and "Alexa" "Amazon" or "Echo" trigger words or combinations invoke Amazon Echo application on an Amazon device.

Presently available intelligent assistance technology performs passive listening only to detect preconfigured trigger words or phrases in a speech input. Furthermore, presently available intelligent assistance technology must be preconfigured to associate specific actions with specific trigger words or phrases. For example, "Hey Siri, open maps" invokes Siri intelligent assistant, and launches a map application that has been preconfigured to correspond to the trigger phrase "open maps" when Siri app is invoked.

A wireless data processing system, wireless data communication device, or a wireless computing platform is collectively and interchangeably referred to herein as a "mobile device" or "mobile devices". Wearable devices are a category of mobile devices. A wearable device is essentially a mobile device, but has a form-factor that is suitable for wearing the device on a user's person. A user can wear such a device as an article of clothing, clothing or fashion accessory, jewelry, a prosthetic or aiding apparatus, an item in an ensemble carried by or with a person, an article or gadget for convenience, and the like. Some examples of presently available wearable devices include, but are not limited to, smart watches, interactive eyewear, devices embedded in footwear, devices wearable as rings or pendants, and pedometers and other clip-ons.

Some wearable devices are independent wearable devices in that they can operate as stand-alone mobile devices. Such a wearable device either includes some or all the capabilities of a mobile device described above or does not need or use the capabilities of a mobile device described above. Other wearable devices are dependent wearable devices in that they operate in conjunction with a mobile device. Such a wearable device performs certain functions while in communication with a mobile device described above.

Natural language is written or spoken language having a form that is employed by humans for primarily communicating with other humans or with systems having a natural language interface.

Natural language processing (NLP) is a technique that facilitates exchange of information between humans and data processing systems. For example, one branch of NLP pertains to transforming human readable or human understandable content into machine usable data. For example, NLP engines are presently usable to accept input content such as a newspaper article or human speech, and produce structured data, such as an outline of the input content, most significant and least significant parts, a subject, a reference, dependencies within the content, and the like, from the given content.

Shallow parsing is a term used to describe lexical parsing of a given content using NLP. For example, given a sentence, an NLP engine determining what the sentence semantically means according to the grammar of the language of the sentence is the process of lexical parsing, to wit, shallow parsing. In contrast, deep parsing is a process of recognizing the relationships, predicates, or dependencies, and thereby extracting new, hidden, indirect, or detailed structural information and contextual meaning from content portions in a given document or some corpora.

SUMMARY

The illustrative embodiments provide a method, system, and computer program product. An embodiment includes a method that detects, at an application executing in a device in a vehicle, in a conversation occurring between two users, a phrase. The embodiment determines that the phrase is usable in providing a navigation directive. The embodiment performs, using Natural Language Processing (NLP), a deep parsing the conversation, the deep parsing extracting a context applicable to the phrase. The embodiment evaluates the context to determine whether the context is related to a navigation of the vehicle. The embodiment computes, at the device, from the conversation, a future location of the vehicle during the navigation. The embodiment identifies, using data from a data source, a suboptimal driving condition on a route between a present location of the vehicle and the future location. The embodiment alerts a user in the vehicle about the suboptimal driving condition on the route.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that while many navigation applications, or navigation apps, are available on mobile devices and data processing systems in modern vehicles, each such navigation app has to be expressly invoked by a user, and expressly supplied with input data by the user, so that the app can provide navigation information to the user. For example, the user has to invoke the navigation app, e.g., by pressing a button or providing a preconfigured trigger phrase to invoke an intelligent assistant, which then invokes the navigation app. Then the user has to input navigation-related instructions, e.g., by textually or verbally inputting a destination, a route preference, etc. only then the navigation app provides routing and navigation information to the user.

Furthermore, the illustrative embodiments recognize that it is often the case that a user chooses to not use a navigation app even though one or more such apps may be available to the user in a vehicle. For example, a driver asks another occupant of a vehicle, e.g., a passenger, for directions to a place, and the passenger provides the direction even though the driver has access to a navigation app. The driver then relies on the direction provided by the passenger instead of using the navigation app.

The illustrative embodiments recognize that in many cases, while the passenger may be familiar with the area, and may provide an acceptable list of turns and street names to navigate a route, the passenger is often unfamiliar with the dynamic conditions existing on that route or a portion thereof. For example, while the passenger may instruct the driver to "make the next left and get on the highway", the passenger may be unaware that after the next turn and before the highway lies a detour due to a construction zone that was put up the night before. Similarly, the passenger may not be aware of an accident, heavy traffic, or other undesirable conditions that might exist in the route he or she is providing to the driver.

Thus, when two users are having a conversation with each other, and one user is providing the other user navigation information in the conversation, a suboptimal routing is a distinct possibility. Suboptimal routing is a routing, i.e., navigation through a route, where one or more undesirable conditions exist. An undesirable condition is a condition that adversely affects a transit or drive through the route or a segment of the route. Some non-limiting examples of the adverse effects of an undesirable condition include, increasing an amount of time required to transit through the segment, decreasing a speed from a specified speed in transiting through the segment, increasing a distance that has to be traveled when the segment is included in the route, increasing a risk of accident when the segment is included in the route, decreasing a safety parameter of the segment, or some combination thereof.

Thus, the illustrative embodiments recognize that a user, e.g., the driver, may be deprived of at least an alert about an undesirable condition, when a navigation app is available but the driver is relying on the driving instructions provided by another human. Therefore, a method which allows a user to not launch a navigation app and which allows the user to obtain instructions from another user in a conversation, but which automatically alerts the user if the conversation attempts to route the user through a segment where suboptimal navigation or driving conditions exist, would be useful.

The illustrative embodiments used to describe the invention generally address and solve the above-described problems and other problems related to avoiding suboptimal conditions when navigation instructions are provided by one human user to another human user in a conversation between the users.

An embodiment can be implemented as a software application. The application implementing an embodiment can be configured as a modification of an existing navigation system, as a separate application that operates in conjunction with an existing navigation system, a standalone application, or some combination thereof.

An embodiment passively listens to a conversation. The embodiment analyzes the words, phrases, and sentences spoken during the conversation. Particularly, the embodiment performs a shallow parsing to determine if any word or phrase spoken in the conversation can possibly have a navigational connotation. Note that the word or phrase need not be preconfigured in the embodiment.

If the shallow parsing indicates that a word or phrase spoken in the conversation could have navigational connotation, i.e., the word or phrase could have been used in the context of vehicular navigation, the embodiment performs deep parsing on a portion of the conversation. The deep parsing establishes a context within which the word or phrase was spoken. The embodiment uses the context from the conversation to determine a degree of likelihood of the word or phrase having been spoken in a navigational context to presently navigate a vehicle on a route.

For example, suppose that the conversation includes the sentence, "make a left at the intersection and turn onto the street." Through shallow parsing, the embodiment determines that the phrase "make a left" has a navigational connotation with a certain likelihood, i.e., the phrase could mean turning a vehicle left at some point on a route to drive on the route. Note that "left" or "make a left" are not preconfigured in the embodiment.

The embodiment then performs deep parsing of the conversation to determine a likelihood that the navigational connotation is the correct meaning of "make a left" within the conversation. The deep analysis by the embodiment reveals that "make a left" occurs at "the intersection" from where "a turn onto the street" has to be made. The portions of the conversation—"the intersection" and "a turn onto the street" provide contextual information to the embodiment that a greater than a threshold likelihood exists that the phrase "make a left" was spoken by one user to another user in the conversation to provide a navigation instruction to the other user.

As another example, suppose that the conversation includes the sentence, "make a left at overworked and turn onto the burnt-out street." Through shallow parsing, the embodiment determines that the phrase "make a left" has a navigational connotation with a certain likelihood, i.e., the phrase could mean turning a vehicle left at some point on a route to drive on the route. Recall that "left" or "make a left" are not preconfigured in the embodiment.

The embodiment then performs deep parsing of the conversation to determine a likelihood that the navigational connotation is the correct meaning of "make a left" within the conversation. The deep analysis by the embodiment reveals that "make a left" occurs at "overworked" from where "a turn onto the burnt-out street" has to be made. The portions of the conversation—"overworked" and "a turn onto the burnt-out street" provide contextual information to the embodiment that a smaller than a threshold likelihood exists that the phrase "make a left" was spoken by one user to another user in the conversation to provide a navigation instruction to the other user. For example, deep parsing of the portions of the conversation—"overworked" and "a turn onto the burnt-out street" implies that the user is likely speaking metaphorically about something other than presently navigating a vehicle on a route.

Depending on the language for which an embodiment is configured, many other words or phrases in the configured language could have navigational connotation. Some more non-limiting examples of phrases with navigational connotation include, "right", "right at the light", "stop at the first sign", "slow going", "on the road", and many others. Note that although each of these example phrases, as many others in the example English language, have a navigational connotation, they can but need not necessarily have a navigational context in a conversation. For example, saying "right" in "turn right [at the intersection]" may have a navigational context, but saying "right" in "I am right [about him]" may not. Similarly, saying "[stay to the] right at the light" may have a navigational context, but "[he was staring] right at the light" may not. Similarly, saying "[prepare to] stop at the first sign" may have a navigational context, but "[he was told to] stop at the first sign [of trouble]" may not. Similarly, saying "[expect] slow going [on ABC road]" may have a navigational context, but "[he was tired of] the slow going [in the project]" may not. Similarly, saying "[stay] on the road" may have a navigational context, but "[I am] on the road [these days]" may not.

Furthermore, even if a word or a phrase has been spoken in a navigation context, that context has to be applicable presently, to wit, at the time the analysis is being performed. For example, "let us go to the beach this weekend" has a navigation context, but the context is for a future navigation and is therefore not applicable for performing a navigation operation or alert as described herein.

As one of ordinary skill in the art will be able to understand from these examples, words and phrases with navigational connotation cannot simply be programmed into an embodiment to trigger any navigation-related operations described herein. An embodiment is configured to analyzes the conversation to determine words or phrases that have a likelihood of having a navigational connotation, and the conversation is further analyzed to determine whether the conversation in fact provides a navigation context such that a greater than a threshold likelihood exists that the word or phrase was spoken for providing navigation instructions from one user to another user in the conversation.

Additionally, in one embodiment, the capabilities for performing the shallow parsing, the deep parsing, or both, are collocated in a device where the embodiment is executing. In another embodiment, the capabilities for performing the shallow parsing, the deep parsing, or both, are located remotely, e.g., on a server that is accessible over a data network from the device where the embodiment is executing. Generally, the analytical capabilities and functions can be distributed between the device and a remote system in any suitable manner within the scope of the illustrative embodiments.

Once an embodiment has determined that a greater than a threshold likelihood exists that a word or phrase was spoken for providing navigation instructions from one user to another user in a conversation, the embodiment determines a present location of the vehicle and a future location of the vehicle based on the navigation instruction. For example, an earlier part of the conversation may have provided a destination, or an objective of the trip being navigated. For example, the conversation may include "let us go to XYZ store" which the embodiment analyzes to identify the location of XYZ store nearest to the present location of the vehicle as a possible destination. Similarly, as another example, the conversation may include "let us go to the movies" which the embodiment analyzes to identify the location of a movie theater nearest to the present location of the vehicle as a possible destination.

If a possible destination choice has passed during the current travel, an embodiment can be configured to reduce a confidence level associated with the past location, increase the confidence level associated with an upcoming location, or both. For example, while going to the movies, if movie theater A has already passed, it is less likely that the user is driving to theater A, and more likely to be driving to theater B that can be reached next via the present route.

Generally, if the conversation provides a destination, changes a previously provided destination, or a destination can be determined with a greater than a threshold likelihood from an analysis of the conversation, the embodiment uses the destination in determining a future event on a route from the present location of the vehicle to that destination.

A future event is a navigation action, such as making a turn, getting on a road, exiting a road, stopping at a point on the route, and other such actions, that will be performed on a route at a time after the present time—the time at which the future event is computed. A future event leads to a future location. In navigating a vehicle via a conversation, a present location is the location of the vehicle where or when the words are spoken, and a future location is a location of the future event (e.g., a location of a stop sign on a road on which the vehicle is presently traveling), or a location that appears on a route after the future event (e.g., a point on a road which goes to the right from the stop sign on the road on which the vehicle is presently traveling).

In many cases, a destination may not be specified in a conversation. For example, the conversation may include "let us go; make a left at the light" which the embodiment cannot analyze to identify any particular destination. However, the analysis does conclude that the conversation has a navigation context, and the words or phrases are spoken to navigate a vehicle from a present location—the location where the words are spoken—to a future location—some location on a road which goes to the right (from the vehicle's direction of travel) from the next light on the present road.

The future location can be regarded as a destination for navigational purposes even if the final destination of the route cannot be ascertained. A route or a route segment connects the present location to the future location. Thus the navigation to the future location need not be treated differently than navigation from one point to the another point in a larger route to a final destination. An embodiment obtains the route between the present location and a future location by interfacing with a map app, a navigation app, a map data source, or some combination thereof.

An embodiment evaluates the navigation conditions on the route between the present location and the future location. For example, the embodiment determines a type of data that is useful in determining whether the route has one or more suboptimal conditions existing thereon. The embodiment selects a data source that can provide current data about the driving conditions on the route. Some examples, of such data sources include, but are not limited to, commercial sources, public information sources, and crowd-sourced repositories, of traffic information, weather information, road obstructions information, information, and other information.

When the embodiment determines that a navigation condition is suboptimal, the embodiment outputs an alert. For example, suppose that a passenger is providing driving directions to a driver and the driving directions are likely to lead the driver through a suboptimal condition. The embodiment detects that driving directions are being provided in the conversation between the passenger and the driver, discovers that a suboptimal condition exists in the route being suggested by the passenger, and alerts the driver, without the driver or the passenger invoking an intelligent assistant or a navigation app, without the driver or the passenger deliberately inputting any navigation-related input into an intelligent application or a navigation app, and simply by having a person-to-person conversation in the presence of an embodiment.

An embodiment may continue passive listening of the conversation and produce more alerts of a similar nature. Particularly, the embodiment computes more future events future locations in a manner described herein, and produces alerts relative to those future locations in a manner described herein.

An embodiment may further provide information when additional or better routing can be performed between the present location and a future location. For example, without a user invoking an intelligent assistant or a navigation app, and without the driver or the passenger deliberately inputting any navigation-related input into an intelligent application or a navigation app, an embodiment presents an option to the user where the user can choose to receive further driving instructions from a navigation app instead of the other user. If the user provides a suitable input to the embodiment, electing to use the navigation app, the embodiment initializes a navigation app accessible to the embodiment by populating the app with the future location or the final destination, and launches the navigation app on a device.

A method of an embodiment described herein, when implemented to execute on a device or data processing system, comprises substantial advancement of the functionality of that device or data processing system in alerting a user about suboptimal conditions relating to driving direction provided by another user in a person-to-person conversation. For example, presently available navigation methods have to be expressly launched with preconfigured trigger phrases and have to be preconfigured with destination and other information to determine a route with optimal conditions. An embodiment provides a method for passively listening to a conversation between two human users and determining that the conversation is occurring in a navigational context and includes driving direction. An embodiment further identifies a possible future location from the conversation and determines whether a suboptimal condition exists on the route to that future location. An embodiment alerts a participant of the conversation about the suboptimal condition in which the participants might find themselves based on their conversation. This manner of navigation alerting using conversation analysis is unavailable in the presently available methods. Thus, a substantial advancement of such devices or data processing systems by executing a method of an embodiment is in assisting a driver with alerts about their possible route based on the conversation the driver is having with another person.

The illustrative embodiments are described with respect to certain types of conversations, portions, words, phrases, contexts, locations, times, events, conditions, data, data sources, apps, interfaces, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
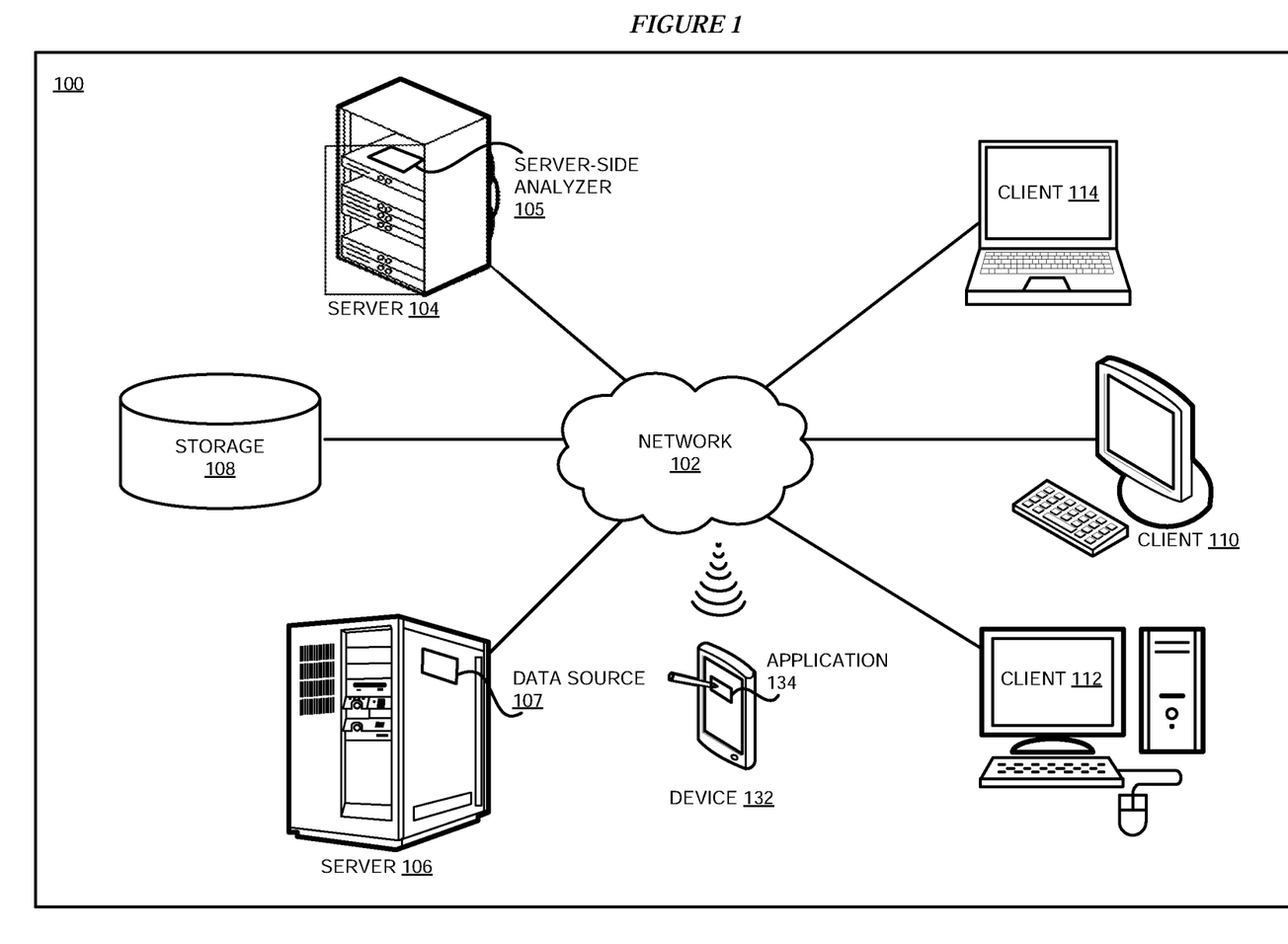
FIG. 1 depicts a block diagram of a network of data processing systems in which illustrative embodiments may be implemented.
Figure 2:
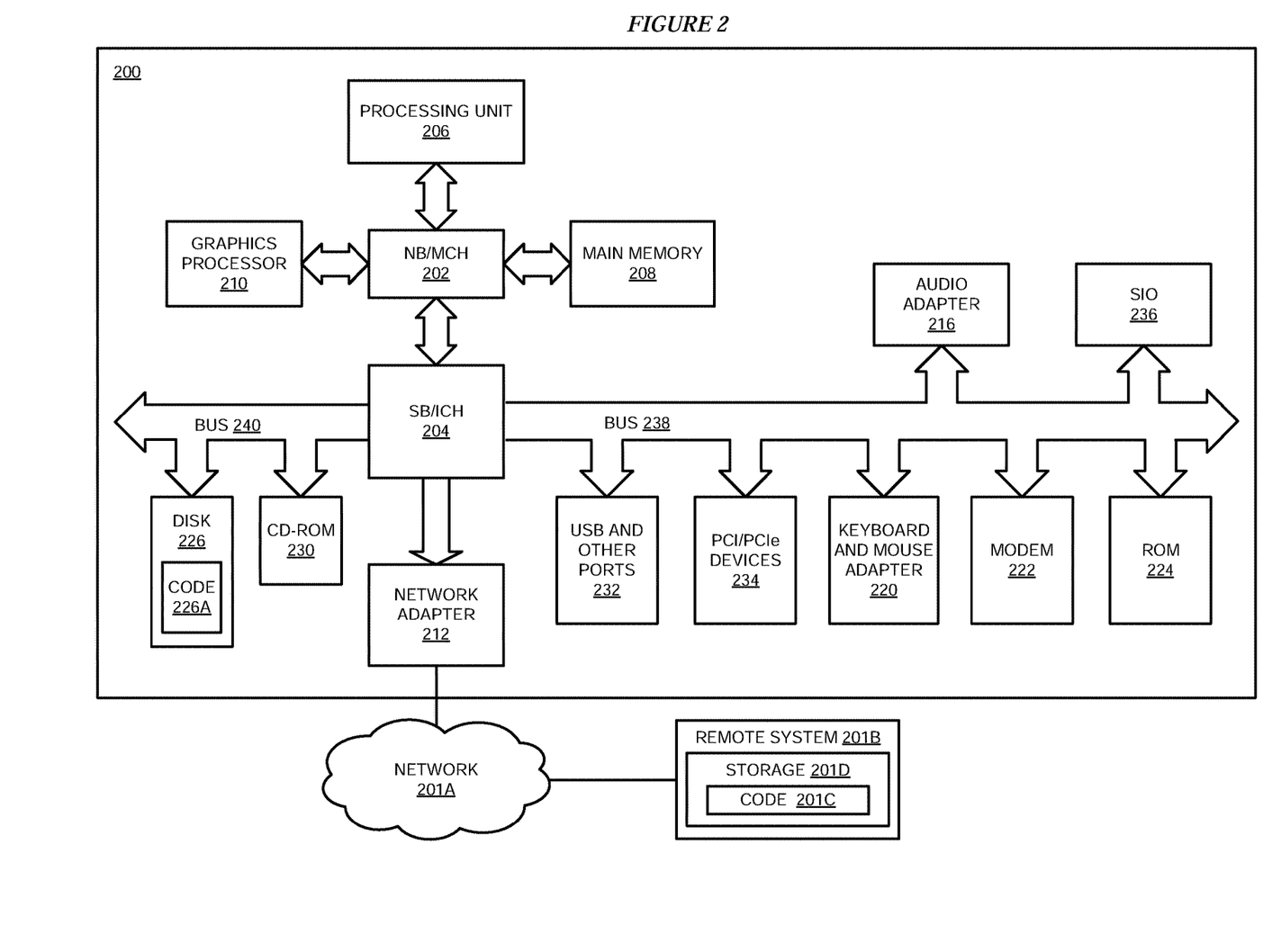
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 may also be a data processing system that is installed or embedded in a vehicle.

Application 134 implements an embodiment described herein. Application 134 uses one or more capabilities, such as a Global Positioning System module (not shown) of device 132 to determine a present location, a speed of travel, and a direction of travel as described herein. Application 134 uses one or more listening capabilities, such as a microphone (not shown) of device 132 to perform passive listening as described herein. Application 134 uses one or more output capabilities, such as a display screen or a speaker (not shown) of device 132 to output an alert as described herein. Application 134 uses one or more navigational capabilities, such as a navigation app (not shown) of device 132 to compute a route between two or more locations as described herein. Application 134 uses one or more analytical capabilities, such as an NLP engine (not shown) of device 132 to perform an analysis of a conversation as described herein. Application 134 may also use a server-side analyzer, such as a remote NLP engine, to perform an analysis of a conversation as described herein. Application 134 uses data source 107 to obtain data that is usable for determining whether a suboptimal condition exists on a route in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
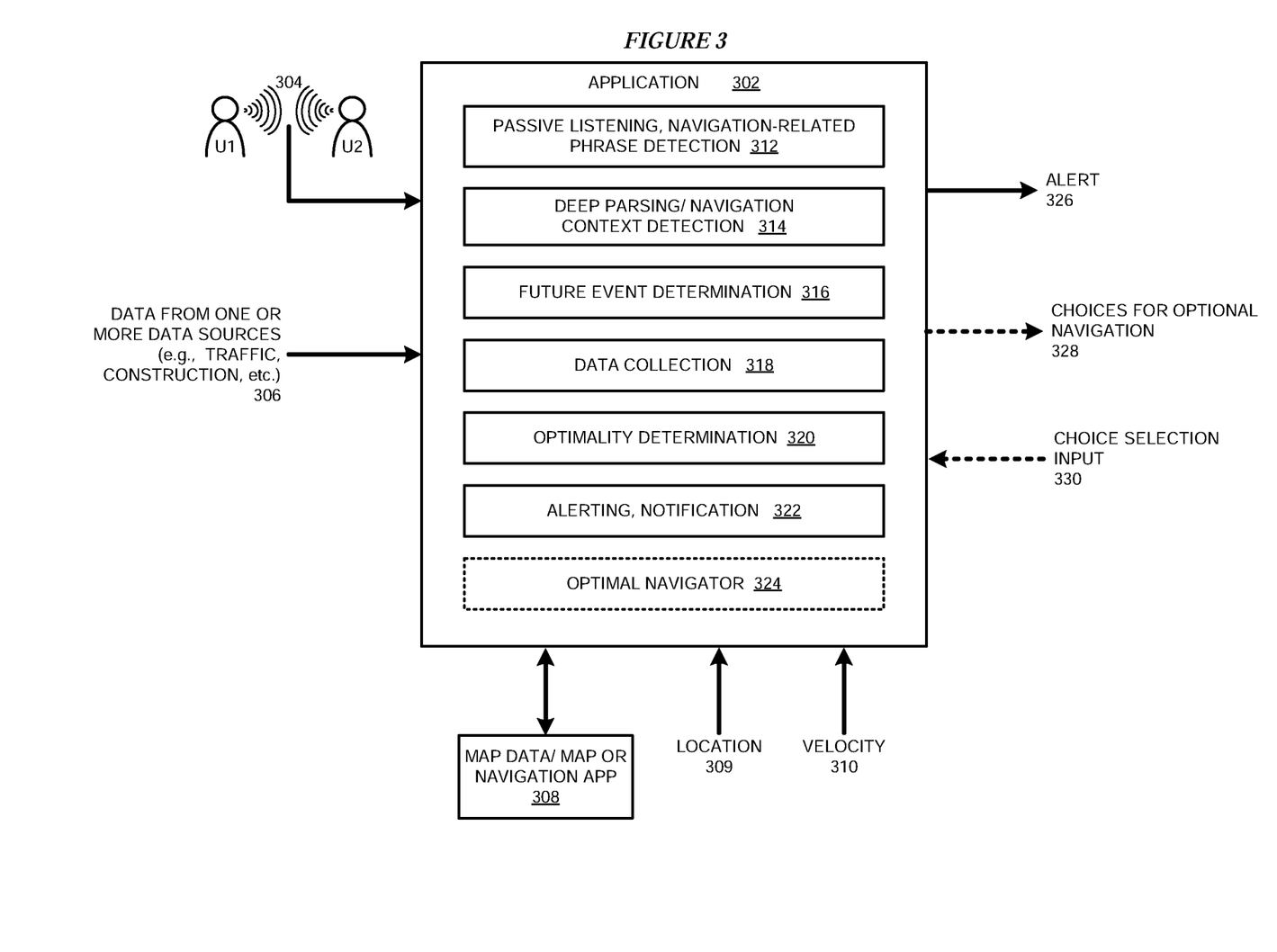
FIG. 3 depicts a block diagram of an example configuration for navigation alerting using conversation analysis in accordance with an illustrative embodiment.

With reference to FIG. 3, this figure depicts a block diagram of an example configuration for navigation alerting using conversation analysis in accordance with an illustrative embodiment. Application 302 is an example of application 134 in FIG. 1.

Conversation 304 as described herein occurs between human user U1 and human user U2. One or more data sources, such as data source 107 in FIG. 1, provide data 306 that is usable to determine whether a suboptimal driving condition exists on a route between a present location and a future location. Map source 308 may be a map data repository, a navigation app, or a mapping app of a suitable kind that is usable to construct a vehicle-navigable route between the present location and the future location. Location information 309 provides the present location of the vehicle.

Alerting by application 302 may not be desirable under certain circumstances. For example, a user, e.g., user U1 or U2, may be able to disable the embodiment when the user is conversing with another user on a mode of public transportation. As another example, a user, e.g., user U1 or U2, may not want application 302 to trigger any alerts unless the users are conversing in a vehicle that is moving at a greater than a threshold speed. Velocity data 310 is indicative of a velocity of the vehicle in which application 302 is executing and is usable to enable or disable a functionality of application 302.

Component 312 passively listens to conversation 304. Component 312 determines, e.g., by using shallow parsing of all or a portion of conversation 304, whether a word or a phrase spoken in conversation 304 is navigation-related, i.e., could be spoken as a part of providing driving directions.

When a word or a phrase is determined, with a greater than a threshold likelihood, to be navigation-related, component 314 performs deep parsing of all or a portion of conversation 304. The deep parsing determines whether a greater than a threshold likelihood exists that the word or phrase was spoken in a navigation context and not in some other non-navigational context. Furthermore, component 314 determines that if a navigation context is likely, whether the navigation context pertains to the driving trip presently being undertaken and not to a future trip or a past trip.

If the deep analysis establishes a greater than a threshold likelihood that a navigation-related word or phrase was spoken in conversation 304 within the context of a navigation that is presently underway, component 316 determines a future event that is likely to occur in the navigation according to conversation 304. Component 316 uses the future event to compute a future location that will be reached as a result of the future event in the present navigation.

Component 318 determines one or more types of data that is usable in determining whether a suboptimal condition exists on the route between the present location —as determined by location information 309—and the future location. Data 306 is of a type determined by component 318, and component 318 collects, requests, or otherwise receives data 306 from a suitable source of the type of data 306.

Component 320 uses data 306 to determine whether the route between the present location and the future location is optimal according to data 306. In other words, component 320 determines whether a suboptimal driving condition exists on the route according to data 306.

When a suboptimal condition exists, component 322 outputs alert 326. Alert 326 informs user U1, U2, or both, that the future event according to conversation 304 will cause the users to experience a suboptimal driving condition. Alert 326 can be output in any suitable form, including but not limited to audible message to the user, text or iconic presentation on a screen, tactile feedback via the device, or an output via another system in the vehicle.

Optionally, component 324 outputs additional choices 328 for switching from, or supplementing, conversation 304-based navigation with using a navigation app, e.g., app 308 for optimal navigation. In response to choices 328, component 324 may receive input 330 from the user, e.g., from user U1 or U2, electing to use app 308 for navigation. Based on input 330, component 324 initializes app 308 to provide navigation to the user for the present drive being undertaken.

Figure 4:
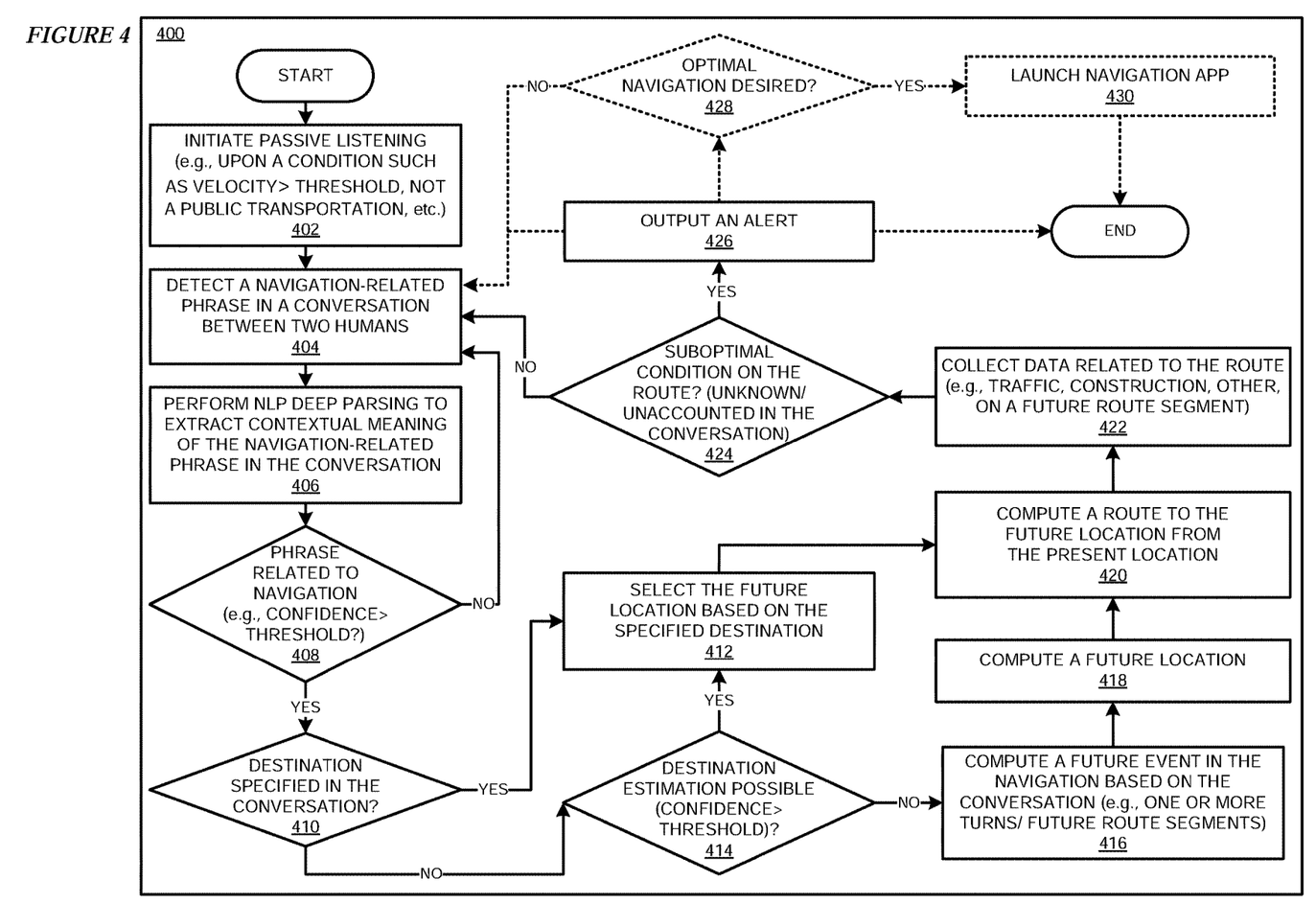
FIG. 4 depicts a flowchart of an example process for navigation alerting using conversation analysis in accordance with an illustrative embodiment.

With reference to FIG. 4, this figure depicts a flowchart of an example process for navigation alerting using conversation analysis in accordance with an illustrative embodiment. Process 400 can be implemented in application 302 in FIG. 3.

The application initiates passive listening of a conversation that is occurring between users (block 402). The initiation of the passive listening may be conditional. For example, an embodiment can be adapted such that the passive listening does not initiate until the device is traveling at a greater than a threshold speed, the user is not traveling in a mode of public transportation, or some combination of these and other conditions.

The application detects a navigation-related word or phrase in the conversation (block 404). The application performs deep parsing of the conversation, or of a portion thereof, to extract or determine a contextual meaning of the detected word or phrase (block 406).

The application uses the determined context to evaluate whether the word or phrase is likely to have been spoken in a present navigation context (block 408). If the likelihood of the word or phrase being spoken in the context of a presently underway navigation does not exceed a threshold ("No" path of block 408), the application returns to block 404 for continued passive listening and detection of navigation-related words or phrases.

If the likelihood of the word or phrase being spoken in the context of a presently underway navigation exceeds a threshold ("Yes" path of block 408), the application determines whether a destination or a future location to be reached in the navigation is specified in the conversation (block 410). If a destination is specified in the conversation ("Yes" path of block 410), the application selects a future location based on the specified destination (block 412).

If a destination is not specified in the conversation or is not determinable from the conversation in a manner described herein ("No" path of block 410), the application evaluates whether a destination is determinable from the conversation in a manner described herein (block 414). If the destination is determinable ("Yes" path of block 414), the application reached block 412 uses the determined destination as the future location.

If the destination is not determinable ("No" path of block 414), the application computes a future event in the navigation based on the conversation (block 416). The application uses map data or an interface to a map application to determine a future location based on the future event (block 418).

Either using the future location from block 412, or the future location from block 418, the application determines a route from the present location to the future location (block 420). The application collects data related to the computed route, the data being usable to determine whether a suboptimal condition exists on the route (block 422).

The application determines whether a suboptimal condition exists on the route (block 424). In one embodiment the application also determines by further analysis of the conversation whether the suboptimal condition has not already been accounted for by the users participating in the conversation.

If a suboptimal condition exists on the route ("Yes" path of block 424), and optionally if the suboptimal condition is unknown to or unaccounted for by the conversation participants, the application outputs an alert to the participants (block 426).

Thereafter, the application may return to block 404 to continue passive listening and detection of navigation-related words and phrases. Alternatively, the application may end process 400 thereafter.

As another alternate operation, optionally, the application may present an option to elect receiving optimal navigation from a navigation app (block 428). If the application determines that a participant desires optimal navigation from the navigation app ("Yes" path of block 428), the application initializes and launches the navigation app (block 430). The application ends process 400 thereafter.

If the application determines that a participant does not desire optimal navigation from the navigation app ("No" path of block 428), the application returns to block 404 to continue passive listening and detection of navigation-related words and phrases.

Thus, a computer implemented method, system or apparatus, and computer program product are provided in the illustrative embodiments for navigation alerting using conversation analysis and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining, by an application executing in a device in a vehicle, a velocity of the vehicle based on velocity data;
   enabling, by the application, once the velocity data indicates that the velocity of the vehicle has reached a threshold velocity, passive monitoring of a conversation occurring between two users in the vehicle;
   detecting, at the application executing in the device in the vehicle, while passively monitoring the conversation occurring between the two users, a phrase;
   determining, using shallow parsing Natural Language Processing (NLP), that the phrase is usable in providing a navigation directive;
   performing, using NLP, a deep parsing of the conversation, the deep parsing extracting a context applicable to the phrase;
   evaluating the context to determine whether the context is related to a navigation instruction spoken between the two users during the conversation for navigation of the vehicle; and
   determining, by computing at the device, from the conversation, a future location of the vehicle during the navigation based upon the navigation instruction responsive to determining that a likelihood that the context is related to a navigation instruction spoken between the two users during the conversation for navigation of the vehicle is greater than a threshold likelihood.

2. The method of claim 1, further comprising:
   presenting to the two users an option to use a navigation application for navigating the vehicle; and
   initiating the navigation application responsive to an input from the two users, the input selection the option, wherein the initiating populates a value in the navigation application, the value being calculated from the conversation.

3. The method of claim 1, further comprising:
   extracting a future event from the conversation; and using the future event in computing the future location.

4. The method of claim 3, wherein the future event is a change of direction to be made by the vehicle.

5. The method of claim 3, wherein the future event is a change of speed to be made by the vehicle.

6. The method of claim 3, wherein the future event is a change of a pathway to be made by the vehicle.

7. The method of claim 1, further comprising:
   analyzing the conversation to determine a destination of the navigation; and
   using the destination to compute the future location.

8. The method of claim 7, wherein the destination is the future location.

9. The method of claim 7, further comprising:
   inferring the destination from a purpose of the navigation, the purpose being specified in the conversation.

10. The method of claim 1, further comprising:
    identifying, using data from a data source, a suboptimal driving condition on a route between a present location of the vehicle and the future location,
    wherein the data source is a crowd-sourced repository of driving conditions related information.

11. The method of claim 1, further comprising:
    further evaluating the context to determine whether the navigation related to the context is presently used to navigate the vehicle.

12. The method of claim 1, wherein information related to the context occurs prior to the phrase in the conversation.

13. The method of claim 1, wherein information related to the context occurs after the phrase in the conversation.

14. The method of claim 1, further comprising:
    performing a shallow parsing of a portion of the conversation, the shallow parsing using the NLP, and the shallow parsing determining that the phrase is usable in providing the navigation directive.

15. The method of claim 1, further comprising:
    passively listening to the conversation, wherein the conversation is not configured to trigger any application in any device.

16. The method of claim 1, wherein the phrase is not preconfigured in the application to trigger any particular operation.

17. A computer usable program product comprising one or more computer-readable storage mediums, and program instructions stored on at least one of the one or more storage mediums, the stored program instructions comprising:

program instructions to determine, by an application executing in a device in a vehicle, a velocity of the vehicle based on velocity data;

program instructions to enable, by the application, once the velocity data indicates that the velocity of the vehicle has reached a threshold velocity, passive monitoring of a conversation occurring between two users in the vehicle;

program instructions to detect, at the application executing in the device in the vehicle, while passively monitoring the conversation occurring between the two users, a phrase;

program instructions to determine, using shallow parsing Natural Language Processing (NLP), that the phrase is usable in providing a navigation directive;

program instructions to perform, using NLP, a deep parsing of the conversation, the deep parsing extracting a context applicable to the phrase;

program instructions to evaluate the context to determine whether the context is related to a navigation instruction spoken between the two users during the conversation for navigation of the vehicle; and     program instructions to determine, by computing at the device, from the conversation, a future location of the vehicle during the navigation based upon the navigation instruction responsive to determining that a likelihood that the context is related to a navigation instruction spoken between the two users during the conversation for navigation of the vehicle is greater than a threshold likelihood.

18. The computer usable program product of claim 17, wherein the computer usable program product is stored in a computer readable storage device in a data processing system, and wherein the computer usable program product is transferred over a network from a remote data processing system.

19. The computer usable program product of claim 17, wherein the computer usable program product is stored in a computer readable storage device in a server data processing system, and wherein the computer usable program product is downloaded over a network to a remote data processing system for use in a computer readable storage device associated with the remote data processing system.

20. A computer system comprising one or more processors, one or more computer-readable memories, and one or more computer-readable storage mediums, and program instructions stored on at least one of the one or more storage mediums, or execution by at least one of the one or more processors via at least one of the one or more memories, the stored program instructions comprising:

program instructions to determine, by an application executing in a device in a vehicle, a velocity of the vehicle based on velocity data;

program instructions to enable, by the application, once the velocity data indicates that the velocity of the vehicle has reached a threshold velocity, passive monitoring of a conversation occurring between two users in the vehicle;

program instructions to detect, at the application executing in the device in the vehicle, while passively monitoring the conversation occurring between the two users, a phrase;

program instructions to determine, using shallow parsing Natural Language Processing (NLP), that the phrase is usable in providing a navigation directive;

program instructions to perform, using NLP, a deep parsing of the conversation, the deep parsing extracting a context applicable to the phrase;

program instructions to evaluate the context to determine whether the context is related to a navigation instruction spoken between the two users during the conversation for navigation of the vehicle; and     program instructions to determine, by computing at the device, from the conversation, a future location of the vehicle during the navigation based upon the navigation instruction responsive to determining that a likelihood that the context is related to a navigation instruction spoken between the two users during the conversation for navigation of the vehicle is greater than a threshold likelihood.

\* \* \* \* \*